United States Patent [19]

Eilles

[11] Patent Number: 4,899,524
[45] Date of Patent: Feb. 13, 1990

[54] HEIGHT ADJUSTER FOR LAWN MOWERS

[76] Inventor: Frank A. Eilles, 46 Autumn Drive, Caledon Hills, Ontario, Canada, L0N 1C0

[21] Appl. No.: 279,164

[22] Filed: Dec. 2, 1988

[51] Int. Cl.⁴ .............................................. A01D 34/74
[52] U.S. Cl. ........................................ 56/17.2; 280/43
[58] Field of Search ................. 56/17.2, 17.1; 403/155, 403/321, 326, 378, 379, 106–108; 280/43; 24/658, 656, 654, 652

[56] References Cited

U.S. PATENT DOCUMENTS

| 2,857,725 | 10/1958 | Canfield | 56/17.2 X |
| 2,882,063 | 4/1959 | Strasel | 56/17.2 X |
| 3,984,191 | 10/1976 | Doty | 24/656 X |
| 4,220,344 | 9/1980 | Kappel | 280/43 |
| 4,738,316 | 4/1988 | Wood | 403/108 X |

FOREIGN PATENT DOCUMENTS

| 200490 | 4/1955 | Australia | 56/17.2 |
| 849564 | 9/1960 | United Kingdom | 280/43 |
| 1288840 | 9/1972 | United Kingdom | 403/155 |

Primary Examiner—Hoang C. Dang
Attorney, Agent, or Firm—Kenneth M. Garrett

[57] ABSTRACT

A lawnmower has a series of openings in the housing into which wheel axles may be selectively engaged to adjust the cutting height. The axle ends are grooved, and the housing provided with a slot into which a clip is insertible to coact with the groove and retain the axle in position.

6 Claims, 4 Drawing Sheets

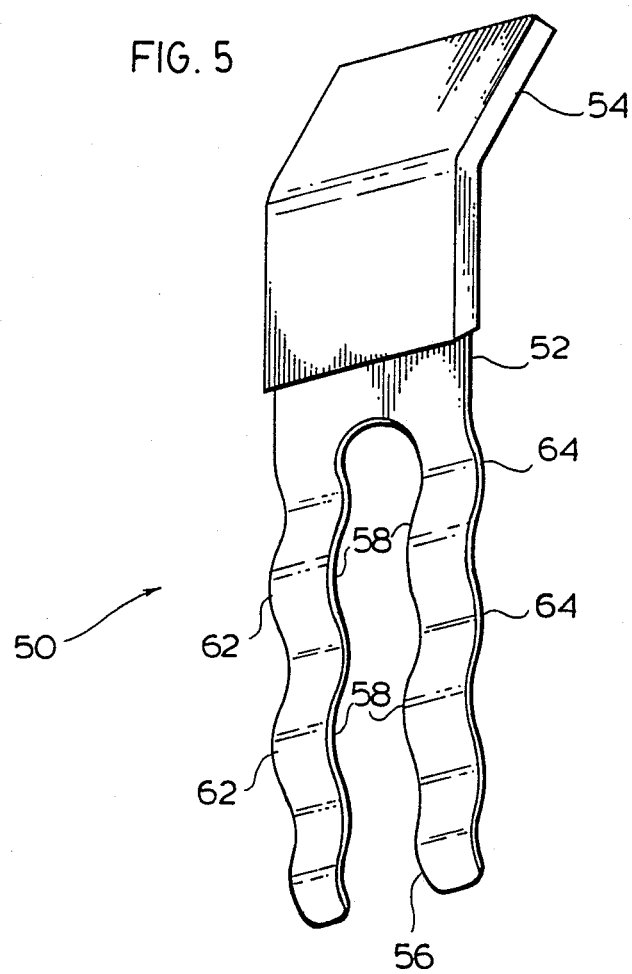

HEIGHT ADJUSTER FOR LAWN MOWERS

FIELD OF INVENTION

This invention relates to lawnmowers. It particularly relates to a simple height adjusting means.

BACKGROUND OF THE INVENTION

In a lawnmower particular of the rotary blade type which includes a housing and wheels journalled on axles mounted from the housing for supporting the housing from a ground surface, the most simple height adjustment means is formed by providing a series of bores in the housing into which the axles may be selectively inserted and secured. Securement is usually by way of a nut which connects to the proximal, threaded end of the axle, and adjustment of cutting height as a consequence involves the use of a wrench, and inverting the lawnmower thereby exposing the cutting blade and creating a potential hazard.

While other sophisticated height adjustment mechanisms are known and are in commercial use, they usually involve additional expense, and are therefore not used on low price, no frills lawnmowers.

It is an object of this invention to provide in a lawnmower a simple, cheap and reliable height adjustment means.

It is a further object of the invention to provide such a means which does not require the inversion of the lawnmower.

In accordance with one object of the invention, this comprises providing in a lawnmower having a series of bores into which a wheel axle may be selectively engaged, a peripheral groove in the proximal end of the axle. The housing is provided with guide means associated with each series of bores, and blade means slidable along the guide means. The blade means is provided with a free edge that engages the peripheral groove to thereby retain the axle in any selected bore.

Preferably the free edge is transversely corrugated, whereby the peaks of the corrugation will move into interfering position with the groove in a manner to urge the axle inwardly in the bore. Suitably the blade means will include a stop to limit the travel of the blade means in the guide means, at which limit a blade corrugation will be in interfering position with the axle. Desirably the guide means will be provided with one or more surface portions that will be in cooperating engagement with corrugations on the blade means when it reaches its travel limit, to assist in retaining the blade means in its inserted position in the guide means.

Suitably the blade means is in the form of a clip comprising a transversely corrugated steel strip formed with a slot therelong, the edges of the strip defining the slot forming two free edges which coact with the peripheral groove on the axle on diametrically opposed sides thereof. In accordance with the preferred embodiment the slot is open at the lower end thereof to permit the clip to be fully disengaged from the guide means, although it is contemplated that a keyhole arrangement could be provided and the clip retained captive in the guide means.

This foregoing objects and aspects of the invention, together with other objects, aspects and advantages thereof will be more apparent from the following description of a preferred embodiment thereof, taken in conjunction with the foregoing drawings.

BRIEF DESCRIPTION OF THE DRAWINGS

FIG. 5 is a perspective view of the clip of the invention.

DESCRIPTION OF THE PREFERRED EMBODIMENT

Figure 1:
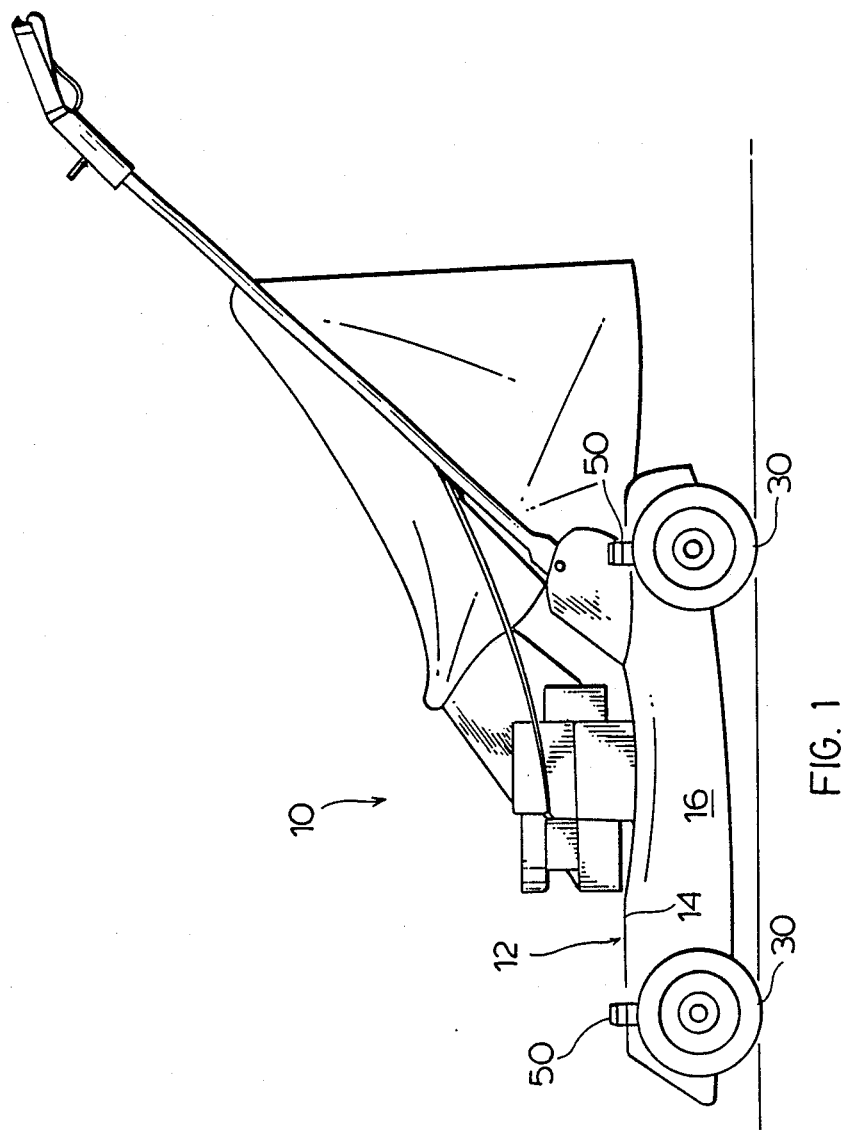
FIG. 1 shows a lawnmower of a type in which the invention may be embodied.
Figure 2:
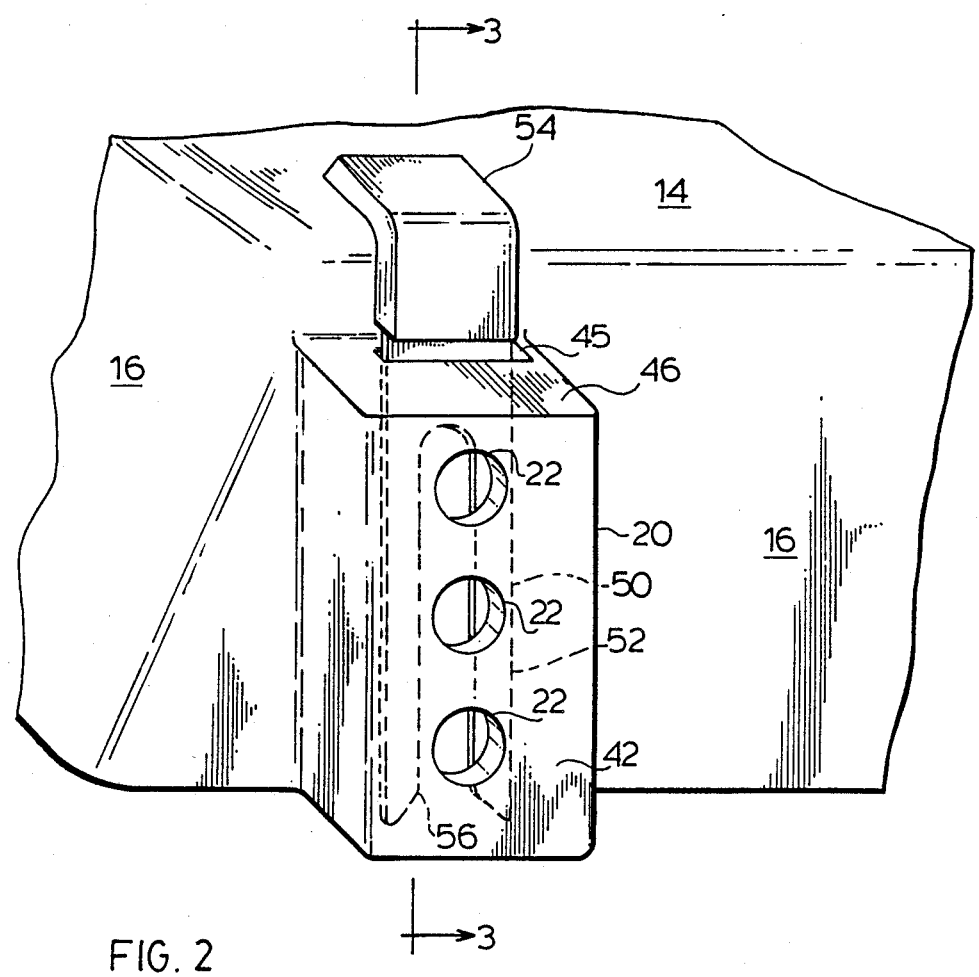
FIG. 2 shows a partial view of one corner of a lawnmower housing adapted for use with the present invention.

Considering the drawings in detail, a lawnmower is shown generally in FIG. 1 wherein it is identified by the numeral 10.

Figure 3:
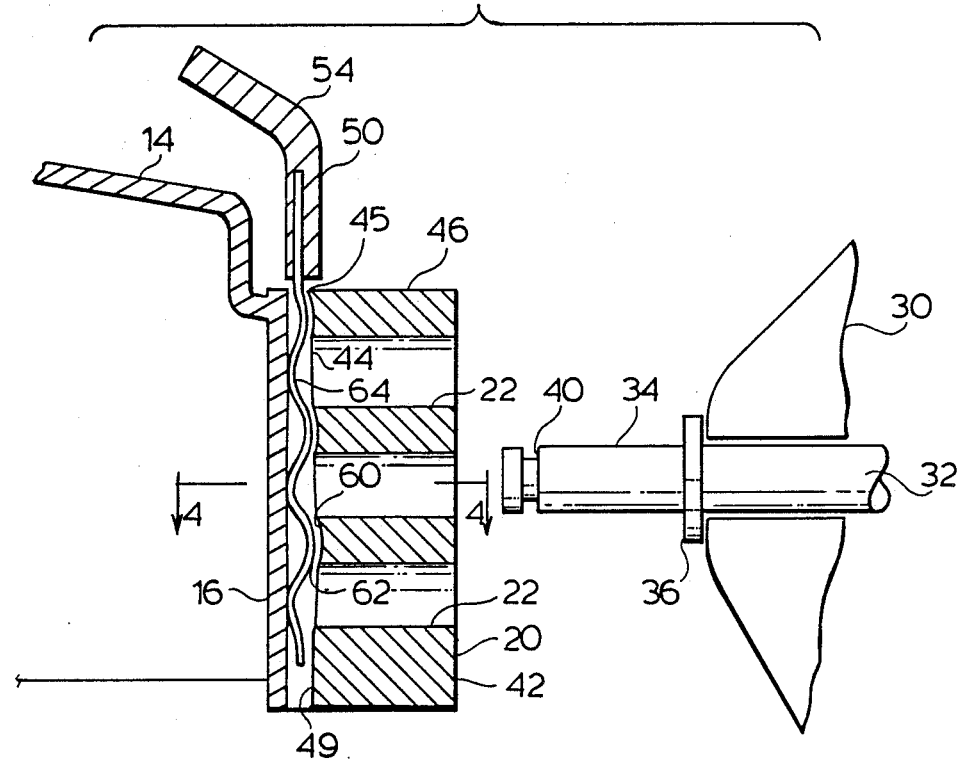
FIG. 3 shows a section along 3—3 of FIG. 2, together with a portion of a wheel and axle in position for engagement in the housing, with an axle retaining clip in its engaged position.

Lawnmower 10 includes a housing 12 including a deck portion 14 and skirt wall 16 depending downwardly therefrom. Adjacent the corners of the deck, the skirt is extended outwardly to form a rectangular prismatic boss 20. Boss 20 is provided with a plurality of similar horizontally aligned bores 22 therein in vertically spaced apart relationship. As best seen in FIG. 3, a wheel 30 is provided with an axle 32 which includes a shaft end portion 34 separated from the axle portion upon which wheel 30 is journalled by a shoulder 36. Shaft end portion 34 is provided with a peripheral groove 40 therearound. Shaft end portion 34 has a diameter whereby it will fit snugly into a selected bore 22, with shoulder 36 contiguous with the outward face 42 of boss 20.

Figure 4:
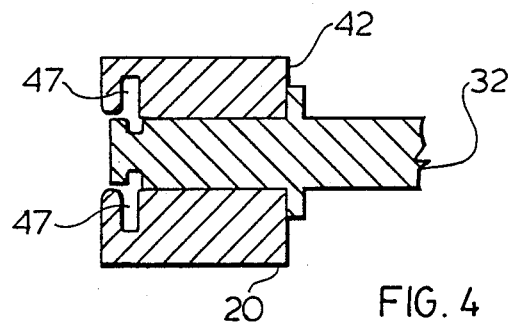
FIG. 4 is a section along 4—4 of FIG. 3, with the axle in engaged position and the clip withdrawn.

Boss 20 is provided with a deep slot 44 having an opening 45 in the upper end 46 of the boss. Slot 44 extends parallel to face 42, and is in part defined by two parallel channels 47 extending on diametrically opposed sides of bores 22. The rearward plane defined by channels 47 is displaced marginally rearwardly of the most rearward portions of the plane in which periperal groove 40 resides when axle 32 is manually inserted into a bore 22. Slot 44 is further defined by a forward face 49. The words "rearward" and "forward" have particular reference here to FIGS. 3 and 4 rather than the direction of travel of lawnmower 10.

A clip 50 is provided consisting of a spring tempered steel strip portion 52 and a handle portion 54. Clip 50 has an elongated opening forming a slot 56 therein, the width of which is intermediate the diameter of axle shaft end 34 and groove 40. Clip 50 is formed with horizontally aligned, equi-spaced corrugations 58 across the width of strip portion 52, and is generally dimensioned to be an easy friction fit in slot 56. However, slot 44 is provided with undulations in forward face 49 comprising small depressions 60. When clip 50 is inserted fully into slot 44, handle portion 54 abuts the upper wall of boss 20 to form a travel limit for the clip, in which position forward facing crests 62 of the corrugations nest in surface depressions 60 to assist in retaining the clip in position. Although shown in FIG. 3 as the crests 62 and depressions 60 being physically spaced apart, this is for the sake of clarity only, and these portions will tend to be in interference.

As earlier indicated, channels 47 generally overlap rearward portions of the plane in which peripheral axle groove 40 resides. As clip 50 is urged downwardly in slot 44, rearward facing crests 64 of the corrugations will interfere moderately strongly with the rearward wall of groove 40, thereby urging axle 32 rearwardly, forcing shoulder 36 into firm abutment with face 42 of boss 20. The parts are dimensioned such that rearward facing crests locate in horizontal planes containing the axes of bores 22 when clip 50 is in its fully inserted position.

It will be appreciated that if clip 50 as shown in FIG. 3 were rotated out of the plane of the paper through 180°, crests 62 would no longer coact with depressions 60 and grooves 40 in the desired manner. Clip 50 is therefore made to be asymmetric, here by handle portion 54 being rearwardly turned, so as to provide an indication to an operator of the correct orientation of the clip.

It is also contemplated that opening 45 might be configured with handle portion 54 to form an asymmetric key-keyway combination, and other alternative as will equally occur to persons in the art.

It will be apparent that the invention may be embodied in many different forms some of which may be preferred according to particular circumstances and it is intended that all such embodiments should be covered by the spirit of the claims appended hereto.

I claim:

1. In a lawnmower including:
    a housing;
    wheels and wheel axles for supporting said housing from a ground surface;
    said housing having a series of vertically spaced apart bores therein associated with each said wheel for selectively engaging a wheel axle therein for varying the clearance of the housing from the ground surface, each said axle having adjacent the proximal end thereof a peripheral groove, the improvement wherein said lawnmower comprises:
    guide means on said housing associated with each series of bores, said guide means comprising a slotted passageway, each said bore of an associated series of bores being completely intersected by said passageway, and
    blade means having a plurality of transversely aligned corrugations therealong slidable along each said slotted passageway, said blade means having an elongated opening to engage said peripheral groove therein to secure a said axle in a selected bore, with corrugated portions of said blade means in interfering relationship with said guide means along the length thereof.

2. A lawnmower as defined in claim 1, wherein one of said blade means and said guide means is provided with a stop to limit travel of said blade means in said groove, and said corrugations are arranged such that when said blade means is positioned at its travel limit, a peak of a said corrugation remote from said wheel is in horizontal alignment with the axis of each said bore.

3. A lawnmower as defined in claim 2, wherein said blade includes an upper, handle portion forming said stop, and a lower dagger portion, and wherein said handle portion is inclined relative to said dagger portion.

4. A lawnmower as defined in claim 1, wherein said corrugations extend across the width of said blade means.

5. A lawnmower as defined in claim 4, wherein said blade means is a spring tempered sheet steel.

6. In a lawnmower including:
    a housing;
    wheels and wheel axles for supporting said housing from a ground surface;
    said housing having a series of spaced apart bores therein associated with each wheel for selectively engaging a wheel axle therein for varying the clearance of the housing from the ground surface, the improvement wherein each said axle is provided adjacent the proximal end thereof with a peripheral groove, and wherein said lawnmower comprises;
    guide means on said housing adjacent each series of bores, said guide means having at least one surface undulation therealong, and
    blade means slidable along each said guide means, said blade means having a transversely corrugated free edge to engage said peripheral groove to secure a said axle in a selected bore, one of said blade means and said guide means being provided with a stop to limit travel of said blade means along said guide means such that when said blade means is positioned at its travel limit, a peak of a said corrugation remote from said wheel is in horizontal alignment with the axis of each said bore, and at least one peak of a said corrugation is in cooperative alignment with said undulation.

* * * * *